United States Patent [19]

Itoh et al.

[11] Patent Number: 4,826,905
[45] Date of Patent: May 2, 1989

[54] SILICONE RUBBER COMPOSITION

[75] Inventors: Kunio Itoh; Kiyoshi Imai; Takeshi Fukuda, all of Gunma, Japan

[73] Assignee: Shin-Etsu Chemical Co., Ltd., Tokyo, Japan

[21] Appl. No.: 131,604

[22] Filed: Dec. 11, 1987

[30] Foreign Application Priority Data

Dec. 12, 1986 [JP] Japan .................. 61-296114

[51] Int. Cl.$^4$ ............................................. C08K 5/06
[52] U.S. Cl. ................................ 524/366; 524/462; 524/463; 524/588; 524/758; 524/795; 525/104; 525/403; 525/474
[58] Field of Search ............ 525/403, 474, 104; 524/462, 463, 366, 588, 758, 795

[56] References Cited

U.S. PATENT DOCUMENTS 4,201,698  5/1980  Itoh et al. ..................... 525/104
4,260,698  4/1981  Tatemoto et al. ............. 525/104

Primary Examiner—Melvyn I. Marquis
Attorney, Agent, or Firm—Millen & White

[57] ABSTRACT

A silicone rubber composition composed of a high-molecular diorganopolysiloxane, a reinforcing silica filler and an organic peroxide as a curing agent is further compounded with a fluorine-containing low-polymeric compound such as poly(chlorotrifluoroethylene) and perfluorinated polyether compound of the formula $F-[-CF(CF_3)-CF_2-O-]_v-O-CF_2-CF_3$, in which v is 2 to 100, as well as fluoroalkyl-substituted organopolysiloxanes. The silicone rubber composition can give a cured silicone rubber product having greatly improved resistance against dynamic fatigue as in repeated cycles of stretching and relaxation.

17 Claims, 1 Drawing Sheet

SILICONE RUBBER COMPOSITION

BACKGROUND OF THE INVENTION

The present invention relates to a silicone rubber composition or, more particularly, to a silicone rubber composition capable of giving a cured rubbery elastomer having excellent resistance against fatigue caused by repeated stretching or bending, which is an essential characteristic property of rubbers used in dynamic applications such as rubber contacts in keyboard instruments, cover boots of isochronous joint in automobiles, diaphragms, tubes for medical pumps and the like. The invention also relates to a cured silicone rubber article obtained by curing the above mentioned silicone rubber composition.

As is well known, silicone rubbers in general have excellent physical properties such as high electric insulation, heat and cold resistance, weatherability, low permanent compression set, rubbery elasticity and the like along with chemical and physiological inertness so that they are useful in a wide field of applications including electric and electronic instruments, business machines, automobiles, aircrafts, food processing and medical instruments, hobby goods and so on. These applications include not only static applications but also dynamic applications in which the rubber-made parts receive repeated mechanical action such as stretching, bending, vibration and the like as is typical in the rubber-made parts used as rubber contacts of keyboard, cover boots of an iso-chronous joint of automobiles, diaphragms and tubes in medical pumps and the like.

Silicone rubbers in general, however, are not quite satisfactory as a rubbery material used in the above mentioned dynamic applications in respect of their relatively low resistance against fatigue by repeated stretching and bending so that it is eagerly desired to improve the dynamic stability of silicone rubbers. It is known that the dynamic fatigue performance of synthetic rubbers can be improved by several means for uniform distribution of crosslinks, low crosslinking density, low elastic modulus, decreased loading and uniform dispersion of fillers, elimination of coarse particles from the filler and so on. These prior art methods, however, are not quite effective for silicone rubbers. For example, the test value of silicone rubbers obtained by using a conventional de Mattia fatigue testing machine can rarely exceed one million cycles in respect of the fatigue resistance against stretching and bending even by undertaking the above mentioned means for improvement having effectiveness in ordinary synthetic rubbers. Accordingly, one of the important problems in the technology of silicone rubbers is to improve the dynamic fatigue performance thereof without affecting the generally excellent physical and chemical properties of silicone rubbers.

SUMMARY OF THE INVENTION

The object of the present invention is therefore to provide a novel organopolysiloxane composition which is curable to a cured silicone rubber article having improved resistance against dynamic fatigue by repeated stretching and bending. The novel silicone rubber composition of the present invention comprises, in admixture, an organopolysiloxane which is conventionally used as a base ingredient of silicone rubbers, a reinforcing silica filler and an amount effective to improve the resistance against dynamic fatigue of cured siliocne rubber articles produced therefrom, of a liquid or waxy low-melting solid fluorine-containing polymer.

The preferred organopolysiloxane composition of the present invention comprises, in admixture:

(A) 100 parts by weight of an organopolysiloxane represented by the average unit formula $R_aSiO_{(4-a)/2}$, in which R is a monovalent hydrocarbon group and the subscript a is a positive number in the range from 1.90 to 2.05;

(B) from 10 to 100 parts by weight of a reinforcing silica filler having a specific surface area of at least 50 $m^2/g$;

(C) from 0.05 to 20 parts by weight of a fluorine-containing polymeric compound which is liquid at room temperature or a waxy solid having a melting point not exceeding 100° C.; and (D) optionally, an organic peroxide curing agent.

The novel organopolysiloxane composition of this invention is characterized by the presence therein of component (C), which is typically a 3,3,3-trifluoropropyl group-containing organopolysiloxane, polymer of chlorotrifluoroethylene of the formula $(CF_2=CFCl)_u$, in which u is a positive integer of 4 to 12 polymer of perfluorinated polyether compound of the formula $F-[-CF(CF_3)-CF_2-O-]_v-O-CF_2-CF_3$, in which v is a positive integer of 2 to 100, polymer of a perfluoroalkyl-containing vinyl ester of the formula $[-CH(OCOCH_2R_f)-CH_2-]_w$, in which $R_f$ is a perfluoroalkyl group and w is a positive integer of 2 to 100, or an esteric perfluoroalkyl group-containing diorganopolysiloxane.

DETAILED DESCRIPTION OF THE PREFERRED EMBODIMENTS

Figure 1:
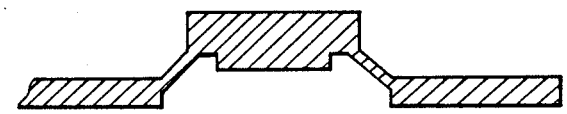
FIG. 1 is a cross sectional view of a rubber contact of a push button switch used for the evaluatin of the rubber compositions described in Example 3 and Comparative Example 2.

The preferred organopolysiloxane composition of the present invention comprises, in admixture:

(A) 100 parts by weight of an organopolysiloxane represented by the average unit formula $R_aSiO_{(4-a)/2}$, in which R is a monovalent hydrocarbon group and the subscript a is a positive number in the range from 1.90 to 2.05;

(B) from 10 to 100 parts by weight of a reinforcing silica filler having a specific surface area of at least 50 $m^2/g$;

(C) from 0.05 to 20 parts by weight of a fluorine-containing polymeric compound which is liquid at room temperature or a waxy solid having a melting point not exceeding 100° C.; and (D) optionally, an organic peroxide curing agent.

The novel organnopolysiloxane composition of this invention is characterized by the presence therein of component (C), which is typically a 3,3,3-trifluoropropyl group-containing organopolysiloxane, polymer of chlorotrifluoroethylene of the formula $(CF_2=CFCl)_u$, in which u is a positive integer of 4 to 12 polymer of perfluorinated polyether compound of the formula $F-[-CF(CF_3)-CF_2-O-]_v-O-CF_2-CF_3$, in which v is a positive integer of 2 to 100, polymer of a perfluoroalkyl-containing vinyl ester of the formula $[-CH(OCOCH_2R_f)-CH_2-]_w$, in which $R_f$ is a perfluoroalkyl group and w is a positive integer of 2 to 100, or an esteric perfluoroalkyl group-containing diorganopolysiloxane.

The other components of the novel composition are rather conventional. When the organopolysiloxane composition is compounded with a suitable amount of the component (C), the composition gives a cured silicone rubber having greatly improved resistance against dynamic fatigue. The improvement is so remarkable that the cured silicone rubber article of the inventive composition is 5 to 20 times more resistant against dynamic fatigue than conventional silicone rubber articles and capable of giving a test value of 10 million cycles or more in the test using a de Mattia fatigue testing machine. Advantageously, the improvement in the fatigue resistance can be obtained without affecting the generally excellent properties of silicone rubbers including the high hardness, high elastic modulus, high tear strength and the like.

The orgnaopolysiloxane component of the novel composition, i.e. component (A), is an organopolysiloxane which may be a conventional one used as the base ingredient in various types of silicone rubber compositions. The organopolysiloxane is represented by the average unit formula $R_aSiO_{(4-a)/2}$, in which R is a monovalent hydrocarbon group and the subscript a is a positive number in the range from 1.90 to 2.05. The monovalent hydrocarbon group denoted by R is exemplified by alkyl groups such as methyl, ethyl, propyl and butyl groups, alkenyl groups such as vinyl and allyl groups, aryl groups such as phenyl and tolyl groups and cycloalkyl groups such as cyclohexyl group. These hydrocarbon groups may be substituted for a part or all of the hydrogen atoms therein by substituents such as halogen atoms excepting fluorine, cyano groups and the like including, for example, chloromethyl and 2-cyanoethyl groups. The limitation for the subscript a mentioned above means that the organopolysiloxane should have a substantially linear moelcular structure or, in other words, is a diorganopolysiloxane. The average degree of polymerization of the diorganopolysiloxane is not particularly limitative and can be so low as to impart the diorganopolysiloxane with a flowable consistency. It is preferable, however, that the average degree of polymerization should be about 3000 or larger so that the diorganopolysiloxane has a gum-like consistency in order that the inventive composition after curing may have a hardness suitable for practical use.

In connection with the type of the monovalent hydrocarbon groups denoted by R in the above given average unit formula, it is preferably that at least 50% by moles of the groups are methyl groups and the remainder of the groups are phenyl and vinyl groups. The content of phenyl and vinyl gropups should preferably not exceed 50% by moles and 6% by moles, respectively, of all of the monovalent hydrocarbon groups denoted by R. In particular, several advantages can be obtained by including 0.01% by moles or larger or, preferably, from 0.01% to 6% by moles of vinyl groups. The terminal group at each of the molecular chain ends of the diorganopolysiloxane is not particularly limitative and may be a silanolic hydroxy group, siliconbonded alkoxy group, trialkyl silyl group, dialkyl monoalkenyl silyl group, monoalkyl dialkenyl silyl group, trialkenyl silyl group and the like.

The composition of this invention comprises a reinforcing silica filler, i.e. component (B), which may be any of known ones conventionally used as a filler in many types of silicone rubber compositions including fumed silica, precipitated silica, silica aerogel and the like. The silica filler should preferably have a specific surface area of at least 50 m$^2$/g in order to exhibit a full reinforcing effect on the mechanical properties of the cured silicone rubber. It is optional that the silica filler is subjected to a surface treatment beforehand with an organosilicon compound, i.e. organosilane, organopolysiloxane and silazane, having a trimethyl sily, dimethyl silyl or dimethyl phenyl silyl group in order to be imparted with hydrophobicity and increased affinity with the matrix of the organopolysiloxane as the component (A).

The amount of the reinforcing silica filler in the inventive composition ordinarily is in the range from 10 to 100 parts by weight or, preferably, from 20 to 70 parts by weight per 100 parts by weight of the organopolysiloxane as the component (A). When the amount of the reinforcing filler is too small, the desired reinforcing effect cannot be fully obtained as a matter of course. When the amount thereof is too large, on the other hand, the silicone rubber composition would give a cured rubber having an excessively high hardness or rather brittleness if not to mention the extreme difficulty encountered in the compounding works of the filler in a so large amount with the organopolysiloxane as the component (A).

The component (C), which is the most characteristic ingredient in the inventive silicone rubber composition, is a fluorine-containing polymeric compound and effective to greatly improve the resistance of the cured silicone rubber against dynamic fatigue. The mechanism of this unexpectedly discovered improving effect is not quite clear but presumably the lubricating effect thereof between the matrix of the organopolysiloxane and the particle of the reinforcing silica filler or between the filler particles. In this regard, this component should be a polymer of a relatively low average degree of polymerization so as to be a liquid at room temperature or a waxy solid having a moderate melting point of 100° C. or below.

Several classes of fluorine-containing polymeric compounds are suitable as the component (C). A first class of the compounds includes organopolysiloxanes having 3,3,3-trifluoropropyl groups bonded to the silicon atoms. Although the molecular structure of the organopolysiloxane is not particularly limitative including straightly linear, branched chain-like and cyclic ones, the organopolysiloxane should preferably have a straightly linear molecular structure or should be a diorganopolysiloxane. The terminal group at each molecular chain end is not particularly limitative but should preferably be a silanolic hydroxy group or a trimethyl silyl group.

Several of the particular examples of the trifluoropropyl group-containing organopolysiloxane belonging to the above mentioned first class include those expressed by the following formulas, in which the symbols Me, Ph, Vi and Fp each denote methyl, phenyl, vinyl and 3,3,3-trifluoropropyl groups, respectively, and the subscripts p, q, r and s are each a positive integer indicating the number of the siloxane units inside the brackets:

HO—[—SiMeFp—O—]$_p$—H; HO—[—SiMeFp—O—]$_p$—[—SiMe$_2$—O—]$_q$—H;
Me$_3$Si—O—[—SiMeFp—O—]$_p$—SiMe$_3$;
HO—[—SiMeFp—O—]$_p$—[—SiMe$_2$—O—]$_q$—[—SiMeVi—O—]$_r$—H;

Me₃Si—O—[—SiMeFp—O—]ₚ—[—SiMePh—O—]ₛ—SiMe₃;

Me₃Si—O—[—SiMeFp—O—]ₚ—[—SiMe₂—O—]q—[—SiMePh—O—]ₛ—SiMe₃;

Ph—Si[—(—O—SiMeFp—)ₚ—OH]₃; Vi—Si[—(—O—SiMeFp—)ₚ—OH]₃; and

HO—[—SiMe₂—O—]ₚ—Si(OH)[—(—O—SiMeFp—)ₚ—OH]₂.

By virtue of the low cohesive force of the fluorine-substituted hydrocarbon groups, these organopolysiloxanes may have flowability at room temperature even when the average degree of polymerization is relatively large or, for example, up to several thousands. It is preferably that these organopolysiloxanes should have a viscosity not exceeding 1,000,000 centistokes at 25° C.

A second class of the fluorine-containing compounds suitable as the component (C) in the inventive composition includes polymers of chlorotrifluoroethylene expressed by the formula (—CF₂—CFCl—)ᵤ, in which the subscript u is a positive integer of 4 to 12. Several commercial products of such polymers are available and can be used as such. A commercial product sold under a tradename of Daifloil by Daikin Kogyo Co., Japan, is quite satisfactory.

A third class of the fluorine-containing polymeric compounds suitable as the component (C) in the inventive silicone rubber composition includes perfluorinated polyether compounds expressed by the formula F—[—CF(CF₃)—CF₂—O—]ᵥ—O—CF₂—CF₃, in which v is a positive integer in the range from 2 to 100 or, preferably, from 3 to 70. Several grades of commercial products are available and can be used as such including, for example, Krytox manufactured by DuPont Co., U.S.A., and Fomblin manufactured by Montedison Co., U.S.A.

A fourth class of the fluorine-containing polymeric compounds suitable as the component (C) in the inventive silicone rubber composition includes polymers of a perfluoroalkyl-containing vinyl ester expressed by the formula [—CH(OCOCH₂Rf)—CH₂—]w, in which Rf is a perfluoroalkyl group and w is a positive integer of 2 to 100. The perfluoroalkyl group denoted by Rf is exemplified by perfluoromethyl, perfluoroethyl, perfluorobutyl, perfluorohexyl, perfluorooctyl, perfluorodecyl, and perfluoroisopropyl groups.

A fifth class of the fluorine-containing polymeric compounds suitable as the component (C) in the inventive silicone rubber composition includes esteric perfluoroalkyl group-containing diorganopolysiloxanes having the siloxane units typically represented by the formula —[—SiMe(O—CO—CH₂—Rf)—O—]ₓ——[—SiMe₂—O—]ᵧ—, in which Me is a methyl group, Rf is a perfluoroalkyl group defined above, x is a positive integer in the range from 2 to 200 and y is zero or a positive integer not exceeding 1000. The molecular chain end of the organopolysiloxane may be terminated by a silanolic hydroxy grouo, silicon-bonded alkoxy group or trihydrocarbyl silyl group though not particularly limitative thereto.

The component (C) in the inventive composition preferably is selected from the compounds belonging to either one of the above defined five classes although it is optional to combine two or more compounds belonging to different classes or belonging to the same class according to need. The amount of the component (C) compounded in the inventive silicone rubber composition preferably is in the range from 0.05 to 20 parts by weight or, preferably, from 0.1 to 10 parts by weight per 100 parts by weight of the organopolysiloxane as the component (A). When the amount of the component (C) is too small, no substanial improvement can be obtained in the properties of the cured rubber of the silicone rubber composition. When the amount thereof is increased to exceed 20 parts by weight, on the other hand, properties of the cured rubber are also badly affected with a problem of bleeding of the compound on the surface of the cured rubber article if not to mention that the de-sired improvement cannot be enhanced any further.

The silicone rubber composition of the invention can be prepared by uniformly blending the above described components (A), (B) and (C) using a conventional rubber compounding machine such as two-roller mills, kneaders, Banbury mixers and the like.

Although it is possible to cure the composition composed of these three components alone, for example, by irradiation with actinic rays, it is preferable that the composition further comprises a curing agent or a cross-linking agent. Several different mechanisms of cross-linking reaction are applicable in this case including the use of an organic peroxide as a curing agent, compounding of the composition with an organohydrogen polysiloxane and a platinum catalyst when the organopolysiloxane as the component (A) has alkenyl, e.g., vinyl, groups bonded to the silicon atoms to effect an addition reaction between the vinyl groups and the silicon-bonded hydrogen atoms and utilization of the mechanism of the condensation reaction between silanol groups and/or hydrolyzable groups. The most convenient and versatile means of effecting the crosslink formation is compounding of the composition with an organic peroxide and heating the peroxide-containing composition. Exemplary of a suitable organic peroxide are benzoyl peroxide, 2,4-dichlorobenzoyl peroxide, 2-chlorobenzoyl peroxide, dicumyl peroxide, 2,5-bis(-tert-butyl peroxy)-2,5-dimethyl hexane and the like. These organic peroxides should be added to the composition in an amount in the range from 0.1 to 5 parts by weight per 100 parts by weight of the organopolysiloxane as the component (A).

It is of course optional according to need that the inventive silicone rubber composition is further admixed with various kinds of known additives conventionally used in silicone rubber compositions including, for example, silane compounds, low-molecular organopolysiloxanes and silazanes having silanolic hydroxy groups which serve as a dispersion aid of the silica filler in the matrix of the organopolysiloxane as well as a plasticity retaining agent, metal oxides as a heat-resistance improver, coloring agents such as pigments, processing aids and so on.

In the following, the silicone rubber composition of the present invention is described in more detail by way of examples and comparative examples, in which the term "parts" refers to "parts by weight". The dynamic fatigue performance of the cured silicone rubbers was evaluated in respect of two items described below.

(1) Fatigue life by 100% stretching

Test specimens were prepared in the form of the #3 dumbbell specified in JIS K 6301, Item 3, and they were subjected to repeated 100% stretching by using a de Mattia-type fatigue testing machine manufactured by Toyo Seiki Co. at a frequency of 5 Hz until breaking to count the number of the cycles of repeated stretching and relaxation.

(2) Key-stroke durability test

Figure 2:
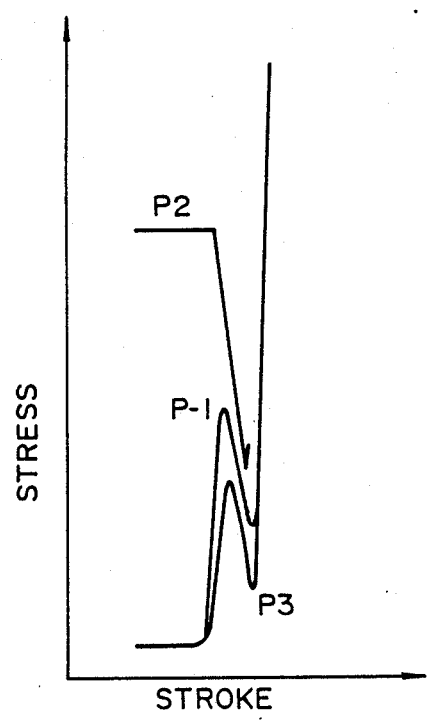
FIG. 2 is a graphic showing of the schematic stroke vs. stress relationship obtained in the key-stroke durability test.

The silicone rubber composition was molded to prepare a rubber contact for push button switch of the configuration having a cross section illustrated in FIG. 1 and the rubber contact was repeatedly pushed at a frequency of 5 Hz with a maximum stroke of 2 mm according to the pattern of the stroke vs. load relationship shown in FIG. 2, in which the curves indicated by the symvols od P1, P2 and P3 are for the peak load, contacting load and resilience force each as a function of the stroke, respectively. The durability of the rubber contact was evaluated by the number of the repeated key strokes when the resilient force shown by the curve P3 in the figure was decreased to 50% of the initial value.

EXAMPLE 1 AND COMPARATIVE EXAMPLE 1

A base compound was prepared by uniformly blending, on a two-roller mill, 100 parts of a gummy organopolysiloxane having an average degree of polymerization of about 7000 as composed of 99.85% by moles of dimethyl siloxane units $(CH_3)_2SiO$ and 0.15% by moles of methyl vinyl siloxane units $(CH_3)(CH_2=CH)SiO$ with vinyl dimethyl siloxy units $(CH_2=CH)(CH_3)_2SiO_{0.5}$ as the end-blocking units at the molecular chain terminals, 30 parts of a fumed silica filler having a specific surface area of 230 m$^2$/g and surface-treated with an organopolysiloxane containing $(CH_3)_3SiO_{0.5}$ units and 1 part of a dimethyl polysiloxane having an average degree of polymerization of about 20 and end-blocked with silanol groups at the molecular chain terminals as a dispersion aid of the silica filler followed by a heat treatment of the blend at 180° C. for 2 hours.

Silicone rubber compositions I to VI were prepared by uniformly admixing 100 parts of the base compound with 3.0 parts of either one of the fluorine-containing polymeric compounds (a), (b), (c), (d), (e) and (f) in the compositions I to VI, respectively, and 0.5 part of 2,5-bis(tert-butyl peroxy)-2,5-dimethyl hexane as a curing agent. For comparison in Comparative Example 1, another silicone rubber composition VII was prepared in just the same formulation as above excepting omission of the fluorine-containing polymeric compound.

Fluorine-containing polymeric compounds:
(a) a 3,3,3-trifluoropropyl-containing methyl polysiloxane of the formula HO—[—SiMe$_2$—O—]$_8$—[—SiMe(CH$_2$CH$_2$CF$_3$)—O—]$_2$—H
(b) a wax-like polymer of trifluorochloroethylene having an average molecular weight of about 1300 (Dailfloil #100, a product by Daikin Kogyo Co.)
(c) a perfluorinated polyether compound of the formula CF$_3$—[—O—CF(CF$_3$)—CF$_2$—]$_n$—OCF$_3$, in which n is 50 to 60 (1Y25, a product by Montedison Co.)
(d) a perfluorinated polyether compound of the formula CF$_3$—[—O—CF(CF$_3$)—CF$_2$—)$_m$—OCF$_3$, in which m is 20 to 30 (Krytox 143AX, a product by DuPont Co.)
(e) a perfluoroalkyl-containing esteric organopolysiloxane of the formula Me$_3$Si—O—[—SiMe(O—CO—CH$_2$—C$_8$F$_{17}$)—O—]$_3$—[—SiMe$_2$—O—]$_5$—SiMe$_3$
(f) a perfluoroalkyl-containing cyclic organopolysiloxane 2-(perfluorobutyl)ethylheptamethylcyclotetrasiloxane Each of the thus prepared silicone rubber compositions I to VII was shaped and cured into a silicone rubber sheet of 2 mm thickness by compression molding at 170° C. for 10 minutes. The cured silicone rubber sheets were subjected to the fatigue life test by 100% stretching in the above described manner. The results given in a unit of 10$^4$ cycles were: 620; 730; 600; 680; 770; 590 and 140 for the compositions I to VII, respectively, indicating that the component (C) compounded according to the present invention is very effective in enhancing the fatigue resistance of the cured silicone rubber articles.

EXAMPLE 2

Six silicone rubber compositions VIII to XIII were prepared, of which the formulation of the compositions VIII to X was substantially the same as in the composition I except that the amount of the fluorine-containing polymeric compound (a) was 0.1, 5.0 and 10.0 parts, respectively, instead of 3.0 parts and the formulation of the compositions XI to XIII was substantially the same as in the compositions II except that the amount of the fluorine-containing polymeric compound (b) was 0.05, 2.5 and 5.0 parts, respectively, instead of 3.0 parts. The results of the fatigue life test by 100% stretching given in a unit of 10$^4$ cycles were: 350; 570; 700; 360; 850 and 910 for the compositions VIII to XIII, respectively, indicating that increase of the amount of the component (C) was effective in further enhancing the resistance against dynamic fatigue.

EXAMPLE 3 AND COMPARATIVE EXAMPLE 2

The silicone rubber compositions I, II, V and VII described above were each shaped and cured by compression molding at 170° C. for 6 minutes into a rubber contact for keyboard as illustrated in FIG. 1 by the cross section, which was subjected to the key stroke durability test in the above described manner to give the results of the numbers of cycles given in a unit of 10$^4$ cycles of: 1500; 1800; 2000 and 240 for the compositions I, II, V and VII, respectively, indicating that addition of the component (C) to the silicone rubber composition is also effective in increasing the durability in the key stroke test.

What is claimed is:
1. In an organopolysiloxane composition curable to a cured silicone rubber comprising, in admixture, an organopolysiloxane, reinforcing silica filler and, optionally, a curing agent or crosslinking agent, the improvement wherein the composition comprises:
(A) 100 parts by weight of an organopolysiloxane represented by the average unit formula $R_aSiO_{(4-a)/2}$, in which R is a monovalent hydrocarbon group and the subscript a is a positive number in the range from 1.90 to 2.05;
(B) from 10 to 100 parts by weight of a reinforcing silica filler having a specific surface area of at least 50 M$^2$/g; and
(C) an amount, from 0.05 to 20 parts by weight, effective to improve the resistance against dynamic fatigue of te cured silicone rubbers produced from the organopolysiloxane composition, of a fluorine-containing polymeric compound which is liquid at room temperature or a waxy solid having a melting point not exceeding 100° C. and which is selected from the group consisting of (a) an organopolysiloxane having a perfluoroalkyl group which is either at least one 3,3,3-trifluoropropyl group bonded to a silicon atom or which is present in siloxane units of the formula —[—SiMe(O—

$CO-CH_2-R_f)-O-]_x-[-SiMe_2-O-]_y-$, in which Me is a methyl group, $R_f$ is the perfluoroalkyl group, the subscript x is a positive integer in the range from 2 to 200 and the subscript y is zero or a positive integer not exceeding 1000, (b) a chlorotrifluoroethylene of the formula $(-CD_2-CFCl-)_u$, in which the subscript u is a positive integer in the range from 4 to 12, (c) a perfluorinated polyether compound of the formula $F-[-CF(CF_3)-CF_2-O-]_y-O-CF_2-CF_3$, in which the subscript v is a positive integer in the range from 2 to 100, and (d) a perfluoroalkyl-containing vinyl ester of the formula $[-CH(OCOCH_2R_f)-CH_2-]_w$, in which $R_f$ is a perfluoroalkyl group and the subscript w is a positive integer in the range from 2 to 100.

2. The composition as claimed in claim 1 which further comprises:

(D) from 0.1 to 5 parts by weight of an organic peroxide.

3. The composition as claimed in claim 1 wherein the fluorine-containing polymeric compound as the component (C) is an organopolysiloxane having at least one 3,3,3-trifluoropropyl group bonded to the silicon atom.

4. The composition as claimed in claim 1 wherein the fluorine-containing polymeric compound as the component (C) is a polymer of chlorothrifluoroethylene expressed by the formula $(-CF_2-CFCl-)_u$, in which the subscript u is a positive integer in the range from 4 to 12.

5. The composition as claimed in claim 1 wherein the fluorine-containing polymeric compound as the component (C) is a perfluorinated polyether compound expressed by the formula $F-[-CF(CF_3)-CF_2-O-]_v-O-CF_2-CF_3$, in which the subscript v is a positive integer in the range from 2 to 100.

6. The composition as claimed in claim 1 wherein the fluorine-containing polymeric compound as the component (C) is a polymer of perfluoroalkyl-containing vinyl ester expressed by the formula $[-CH(OCOCH_2R_f)-CH_2-]_w$, in which $R_f$ is a perfluoroalkyl group and the subscript w is a positive integer in the range from 2 to 100.

7. The composition as claimed in claim 1 wherein the fluorine-containing polymeric compound as the component (C) is an esteric perfluoroalkyl group-containing diorganopolysiloxane having the siloxane units expressed by the formula $-[-SiMe(O-CO-CH_2-R_f)-O-]_x-[-SiMe_2-O-]_y-$, in which Me is a methyl group, $R_f$ is a perfluoroalkyl group, the subscript x is a positive integer in the range from 2 to 200 and the subscript y is zero or a positive integer not exceeding 1000.

8. The composition as claimed in claim 1 wherein the monovalent hydrocarbon group denoted by the symbol R in the average unit formula representing the organopolysiloxane as the component (A) is selected from the class consisting of methyl, phenyl and vinyl groups.

9. The composition as claimed in claim 1 wherein the organopolysiloxane as the component (A) is a diorganopolysiloxane having an average degree of polymerization of at least 3000.

10. A cured silicone rubber article which is a cured product of an organopolysiloxane composition according to claim 1.

11. The article as claimed in claim 10 wherein the fluorine-containing polymeric compound as the component (C) is an organopolysiloxane having at least one 3,3,3-trifluoropropyl group bonded to the silicon atom.

12. The article as claimed in claim 10 wherein the fluorine-containing polymeric compound as the component (C) is a polymer of chlorotrifluoroethylene expressed by the formula $(-CF_2-CFCl-)_u$, in which the subscript u is a positive inte-ger in the range from 4 to 12.

13. The article as claimed in claim 10 wherein the fluorine-containing polymeric compound as the component (C) is a perfluorinated polyether compound expressed by the formula $F-[-CF(CF_3)-CF_2-O-]_v-O-CF_2-CF_3$, in which the subscript v is a positive integer in the range from 2 to 100.

14. The article as claimed in claim 10 wherein the fluorine-containing polymeric compound as the component (C) is a polymer of perfluoroalkyl-containing vinyl ester expressed by the formula $[-CH(OCOCH_2R_f)-CH_2-]_w$, in which $R_f$ is a perfluoroalkyl group and the subscript w is a positive integer in the range from 2 to 100.

15. The article as claimed in claim 10 wherein the fluorine-containing polymeric compound as the component (C) is an esteric perfluoroalkyl group-containing diorganopolysi-loxane having the siloxane units expressed by the formula $-[-SiMe(O-CO-CH_2-R_f)-O-]_x-[-SiMe_2-O-]_y-$, in which Me is a methyl group, $R_f$ is a perfluoroalkyl group, the subscript x is a positive integer in the range from 2 to 200 and the subscript y is zero or a positive integer not exceeding 1000.

16. The article as claimed in claim 10 wherein the monovalent hydrocarbon group denoted by the symbol R in the average unit formula representing the organopolysiloxane as the component (A) is selected from the class consisting of methyl, phenyl and vinyl groups.

17. The article as claimed in claim 10 wherein the organopolysiloxane as the component (A) is a diorganopolysiloxane having an average degree of polymerization of at least 3000.

* * * * *